United States Patent [19]
Somekh

[11] 3,713,289
[45] Jan. 30, 1973

[54] MOTIVE FLUIDS FOR EXTERNAL COMBUSTION ENGINES

[75] Inventor: George S. Somekh, New Rochelle, N.Y.

[73] Assignee: Union Carbide Corp., New York, N.Y.

[22] Filed: March 11, 1971

[21] Appl. No.: 123,434

Related U.S. Application Data

[63] Continuation-in-part of Ser. No. 862,526, Sept. 30, 1969, abandoned.

[52] U.S. Cl. ........................................60/36, 252/67
[51] Int. Cl. .............................................F01k 25/00
[58] Field of Search ..........................60/36; 252/67

[56] References Cited

UNITED STATES PATENTS

| | | | |
|---|---|---|---|
| 3,282,048 | 11/1966 | Murphy et al. | 60/36 |
| 3,516,246 | 6/1970 | McEwen | 60/36 |

*Primary Examiner*—Edgar W. Geoghegan
*Assistant Examiner*—A. M. Ostrager
*Attorney*—Paul A. Rose, John Aldo Cozzi and Bernard Francis Crowe

[57] ABSTRACT

A new class of motive fluids for external combustion engines characterized by a thermo-dynamic property which render them superior to water in external combustion engines.

19 Claims, No Drawings

MOTIVE FLUIDS FOR EXTERNAL COMBUSTION ENGINES

This is a continuation-in-part of Ser. No. 862,526 filed Sept. 30, 1969, now abandoned.

This invention relates to the production of mechanical or electrical power using new power fluids.

In one respect the invention relates to new motive fluids for externally heated engine systems.

In another aspect, the invention relates to motive fluids and power systems using all types of engines (such as, for example, turbines, or reciprocating engines) as the prime mover in the power system, which utilize a vapor-liquid engine cycle.

Due to its extremely low cost and ready availability, water has been used as the power fluid in a vast majority of such systems. However, because of its low molecular weight, water has proven to be relatively inefficient for it requires practically small engines and/or turbine blades. Efficiency is also lowered in the conventional power cycle because of the high freezing point of water and its low vapor pressures near freezing point. The turbine is also subject to erosion of the turbine blades resulting from excessive liquid formation in the turbine under working fluid. The ordinary expedient to minimize the liquid formation is to utilize one or more re-heat cycles which increases the cost of the system.

Thus it would be advantageous to utilize the fluids which do not possess disadvantages of water in externally heated engine systems, and which can be utilized in both large-scales and small-scale systems.

It has now been found that a group of compounds, more fully described herein, possess one or more properties that are superior to those of water for use in power cycles. These systems are also characterized by the ability to be used in systems having lower investment costs and systems which use water, and yet these compounds are also capable of higher efficiency than a water system.

It has further been found that the fluids of the instant invention can be used in binary fluid systems while avoiding excessively high and low pressures.

The fluids of the instant invention can be used in a variety of power generation devices, such as central-station, power plants, central-station nuclear power plants, gas powered air conditioners, space vehicles, heating/electric power systems for homes and buildings, industrial waste heat recovery systems, and self-propelled vehicles of all types including automobiles, boats, ships and railroads.

The power fluids of the instant invention are phosphorous halides, titanium halides, silicon halides, fluorinated cyclic amines, tetraalkyl silanes having from 1 to about four carbon atoms in the alkyl groups and alkyl halosilanes containing from one to about eight carbon atoms in the alkyl groups.

Representative phosphorous halides include $$PCl_3, PBr_3, PFCl_2,$$

and the like.

Representative titanium halides include; titanium tetrachloride, titanium tetrabromide, titanium tetrafluoride, dichlorodibromo titanium and the like.

Representative silicon halides include; silicon tetrachloride, trichloro silane, dibromochloro silane, iodo trichlorosilane, silicon tetrabromide, dichlorodiiodo silane, and the like.

The preferred tetraalkyl silanes include tetramethyl silane and tetraethyl silane, although tetrapropyl silane, tetraisopropyl silane, and the like can also be used if desired.

Representative alkyl halosilanes include methyltrichlorosilane, trimethylchloro silane, trimethylfluoro silane, ethyltrichloro silane, diethyldifluoro silane, methyldichloro silane, trichloromethyl silane, and the like.

The following compilation represents some specific examples and thermodynamic properties of the motive fluids of the instant invention:

| Compound | Molecular Weight | Boiling Point °C | Freezing Point °C | Critical Temp. °C | Max. use Temp. °C |
|---|---|---|---|---|---|
| $PCl_3$ | 137.3 | 75.5 | −112 | 290.0 | >300 |
| $PBr_3$ | 270.7 | 172.9 | −40 | 458.1 | — |
| $PFCl_3$ | 120.8 | 13.85 | −144.0 | 189.8 | — |
| $SiCl_4$ | 169.9 | 57.6 | 70 | 233 | >800 |
| $SiCl_3H$ | 135.5 | 31.8 | −128.2 | 206.0 | 500 |
| $SiBr_2Cl_2$ | 258.8 | 104.4 | −45.5 | 318.9 | >400 |
| $SiCl_3I$ | 261.4 | 113.5 | −60 | 321.7 | >400 |
| $TiCl_4$ | 189.7 | 136.4 | −25 | 370 | >1000 |
| $TiBr_4$ | 367.5 | 233.4 | 39.0 | 537 | >1000 |
| $(CH_3)_4Si$ | 88.2 | 27.0 | −102.1 | — | 550 |
| $(C_2H_5)_4Si$ | 144.3 | 153.0 | −82.5 | — | >400 |
| $CH_3Cl_3Si$ | 149.5 | 65.7 | −77.5 | — | >400 |
| $(CH_3)_3ClSi$ | — | 57.9 | −57.7 | — | >400 |
| $(CH_3)_3FSi$ | — | 16.4 | −74.3 | — | >400 |
| $C_2H_5Cl_3Si$ | 163.5 | 99.5 | −105.6 | — | 400 |
| $(C_2H_5)_2F_2Si$ | — | 58.0 | — | — | 400 |
| $CH_3Cl_2HSi$ | 115.0 | 42.3 | −93 | 198 | 400 |
| $C_5F_5N$ | 169.1 | 83.3 | −41.5 | — | 600 |
| $C_4F_4N_2$ | 152.1 | — | — | — | 600 |

The comparable properties of water are as follows:

| | | | | | |
|---|---|---|---|---|---|
| $H_2O$ | 18.0 | 100.0 | 0.0 | 374.0 | >>800 |

A particularly important advantage of the motive fluids of the instant invention is that they can be employed in power systems for self-propelled vehicles and do not give off large amounts of waste products which would further contaminate the polluted air surrounding many of our metropolitan areas today. The heating plants for such systems emit a substantially lower amount of pollutants to the air. External combustion engines can employ more air and longer burning times than the conventional internal combustion engines used today, thus permitting a much cleaner exhaust.

Presently, extensive research is being conducted to find alternatives to the internal combustion engine. Turbine powered automobiles using steam as the motive fluid are being investigated for feasibility by representatives of the automotive industry. Other companies have been looking into the use of fluorocarbons as the motive fluid in turbine engines. The steam and fluorocarbons of these systems can be replaced with the fluids of the instant invention and thus be able to utilize the superior properties of the motive fluids of the instant invention.

Much research is also being conducted today for operational power systems in space vehicles. Here, the size of the power system is a primary consideration. The smaller engine sizes permissible when the instant motive fluids are utilized as well as the high efficiencies available from such fluids makes such utilization particularly advantageous for space vehicles.

The standard external combustion engine system is composed of a boiler to convert the motive fluid from a liquid to vapor and thus imparting working energy, a prime mover to operate from the working energy in the motive fluid, and a condenser to reconvert the spent vapor back into liquid form. The boiler can be heated in a number of ways including but not limited to the burning of conventional fuels and nuclear power. The prime mover can be a turbine engine or a reciprocating piston engine. In a binary cycle, the condenser can be a heat exchanger wherein the high-temperature fluid is converted from vapor back to liquid and the low-temperature fluid picks up additional heat energy from this transformation. Ordinarily, the condenser is water or air cooled.

A high-temperature fluid is one when employed in a binary cycle possesses a boiling point higher than the other fluid in the cycle. In like manner, a low-temperature fluid of a binary cycle is that one having a lower boiling point than the other fluid of the cycle. No precise standards can be given for the terms are relative.

A binary cycle can be successfully carried out by using one fluid for the high-temperature end of a power cycle and another fluid for the low-temperature end. Thus, a plurality of prime movers, i.e., turbines or reciprocating engines, can be utilized in the same system. Here, the high-temperature fluid, after passing through a turbine section in an expanded state, is condensed by countercurrent heat exchange with the companion low-temperature fluid. This fluid goes through a second turbine section, then is condensed with water and pumped back to the heating unit.

The heating unit in these systems can be a low grade gas combustion operation such as combustion from natural gas. It can also be a nuclear heating unit. The function of the heating unit is to transfer heat to the working fluids to enable them to activate the prime mover.

A binary cycle can use both a high-temperature fluid and a low-temperature fluid of the present invention. Alternatively, such a cycle can use one fluid of the present invention, either a high-temperature or a low-temperature fluid, and another fluid for the other end of the cycle. For example, titanium tetrachloride ($TiCl_4$, a fluid of the present invention) can be used for the high-temperature end of the cycle and a fluorocarbon such as difluorodichloromethane can be used as the low-temperature fluid. A reverse example is the utilization of water as the high-temperature fluid and tetramethyl silane, a fluid of the present invention, as the low-temperature fluid.

Contemplated within the scope of the present invention is the utilization of one or two fluids of the present invention in combination power generation/air conditioning and heating systems. In a gas powered air conditioner, heat supplied from the combustion of natural gas is transferred to a power fluid, which in turn is expanded through a turbine that drives the compressor of a refrigeration cycle.

Such a system can be operated by combinations of the known fluids and the fluids of the present invention. Obviously, the fluids to be used as refrigerants selected from those of the present invention must be the low-boiling ones.

Titanium tetrachloride can be used as the power fluid and a commercial fluorocarbon refrigerant can be used as the refrigeration fluid.

At times, it may be more practical to use a single fluid for both the power and refrigeration cycles. This does, of course, mean a compromise of the fluid's properties. For example, tetramethyl silane, which is lower boiling than an optimum power fluid and higher-boiling than an optimum refrigerant, can be used as the single fluid.

A particularly useful fluid of the present invention is titanium tetrachloride ($TiCl_4$). Its critical temperature (370°C) is very near that of water (374.4°C), yet the saturated vapor pressure at elevated temperatures is considerably lower with $TiCl_4$ than with water. While the vapor pressure of water at 300°C is 64,000 mm Hg, the vapor pressure of $TiCl_4$ at the same temperature is merely 18,000 mm Hg. Furthermore, $TiCl_4$ has a substantially lower freezing point (−25°C) than water (0°C).

A temperature-entropy diagram for $TiCl_4$ reveals that the relatively low heat capacity of the fluid results in a rather steep saturated liquid curve, which in turn yields greater efficiency. The saturated vapor curve is nearly vertical so that expansion of saturated or superheated vapor would tend not to result in liquid formation in the expander. Thus, reheat cycles—and the associated complexity and increased investment costs—would not be needed.

Another fluid is phosphorous trichloride ($PCl_3$) which has a considerably higher vapor pressure than water at 50°C (330 mm Hg vs. 93 mm Hg) so that expansion down to low temperatures would result in the need for engines of considerably smaller sizes with $PCl_3$ than with water. Yet, at higher temperatures the vapor pressures of $PCl_3$ are actually lower than those of water. For example, at 280°C the vapor pressure of $PCl_3$ is 35,000 mm Hg, whereas that of water is 45,000 mm Hg. Furthermore, $PCl_3$ has a freezing point of −112°C.

Analysis of a $PCl_3$ temperature-entropy diagram indicates that the saturated vapor curve becomes more vertical as the temperature is reduced, whereas a temperature-entropy diagram for water shows that the saturated vapor curve becomes more horizontal as the temperature is reduced. Thus, $PCl_3$ can be used in supercritical cycles whereby little or no liquid is obtained in the engine when the fluid is expanded down to low temperatures (i.e., −25°C).

Another fluid of the instant invention is dibromodichlorosilane ($SiBr_2Cl_2$) for it can be used at a higher temperature range than $PCl_3$. This fluid also has vapor pressures that, compared to water, are lower at high temperatures and higher at low temperatures. It has a moderate boiling point (104.4°C) and low freezing point (−45.5°C).

the temperature-entropy diagram of $SiBr_2Cl_2$ shows a nearly vertical saturated vapor curve. The high slope is suitable for the expansion of both super-critical and slightly super-heated vapors at moderately high temperatures.

It is emphasized that the invention resides, not in any particular power system or apparatus, but rather in a new class of power fluids which can be employed in a system having an external combustion engine as its driving force, such as a turbine or reciprocating piston engine. The system is enhanced by full utilization of the properties of the instant power fluids rather than by any manipulation or readjustment of the equipment used to produce electrical or mechanical power.

The motive fluids of this invention are uniquely adapted to imparting working energy and internal combustion engines in their conversion from liquid to vapor and then utilizing the working energy of said vapor to operate a prime mover.

What is claimed is:

1. A method of imparting working energy in an external combustion system which comprises converting a motive fluid selected from the class consisting of titanium halides, phosphorous halides, silicon halides, tetraalkyl silanes wherein the alkyl group contain from about one to four carbon atoms, and alkyl halosilanes wherein the alkyl groups contain one to about eight carbon atoms from liquid to vapor and utilizing the working energy of said vapor to operate a prime mover.

2. Method claimed in claim 1 wherein the motive fluid is a titanium halide.

3. Method claimed in claim 2 wherein the titanium halide is titanium tetrachloride.

4. Method claimed in claim 1 wherein the motive fluid is a phosphorous halide.

5. Method claimed in claim 4 wherein the phosphorous halide is phosphorous trichloride.

6. Method claimed in claim 1 wherein the motive fluid is a silicon halide.

7. Method claimed in claim 6 wherein the silicon halide is dibromodichlorosilane.

8. Method claimed in claim 6 wherein the silicon halide is tetrachlorosilane.

9. Method claimed in claim 6 wherein the silicon halide is trichlorosilane.

10. Method claimed in claim 1 wherein the motive fluid is a tetraalkyl silane.

11. Method claimed in claim 10 wherein the tetraalkyl silane is tetramethylsilane.

12. Method claimed in claim 10 wherein the tetraalkyl silane is tetraethylsilane.

13. Method claimed in claim 1 wherein the motive fluid is an alkylhalosilane.

14. Method claimed in claim 13 wherein the motive fluid alkylhalosilane is methyltrichloro silane.

15. Method claimed in claim 13 wherein the alkylhalosilane is trimethylchloro silane.

16. Method claimed in claim 13 wherein the alkylhalosilane is trimethylfluoro silane.

17. Method claimed in claim 13 wherein the alkylhalosilane is ethyltrichloro silane.

18. Method claimed in claim 13 wherein the alkylhalosilane is diethyldifluoro silane.

19. Method claimed in claim 13 wherein the alkylhalosilane is methyl dichlorosilane.

* * * * *